S. A. REEVE.
FLUID METER.
APPLICATION FILED SEPT. 10, 1910.
1,125,712.
Patented Jan. 19, 1915.
2 SHEETS—SHEET 1.
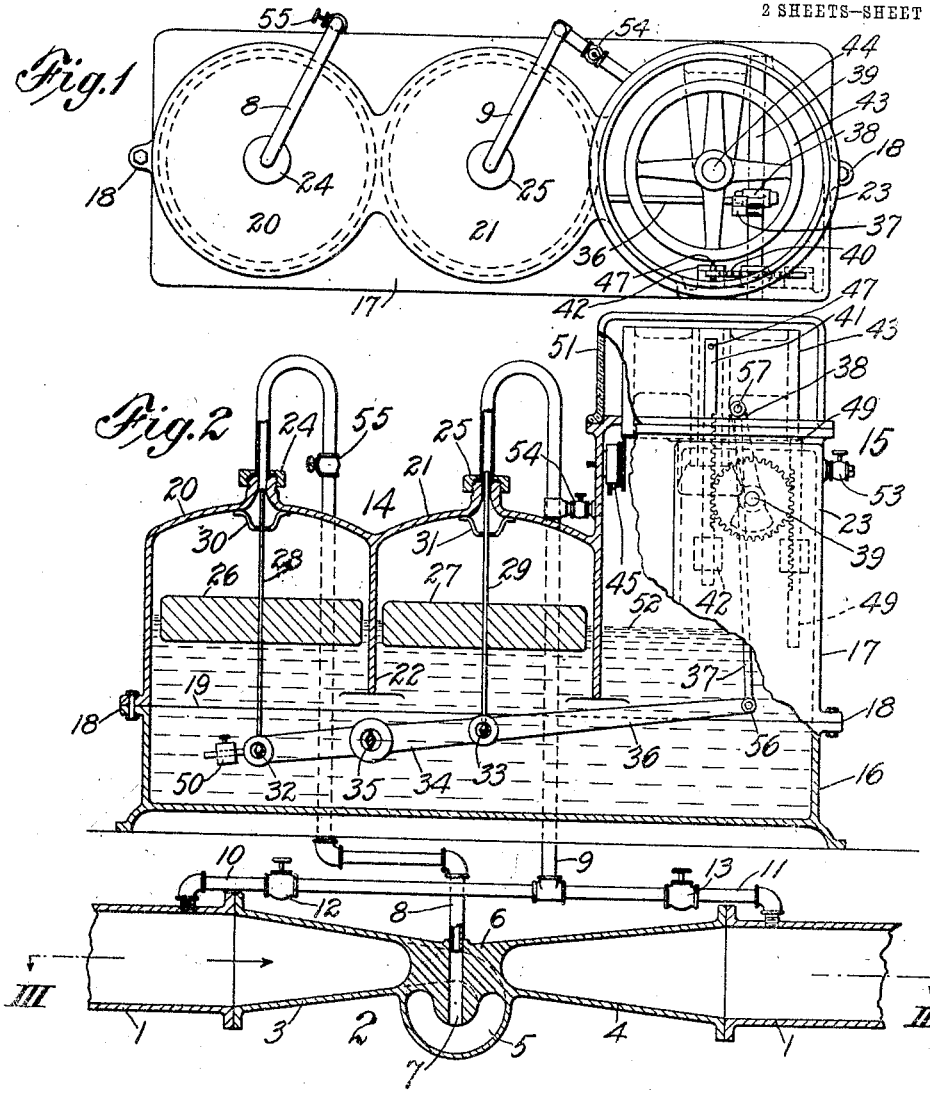

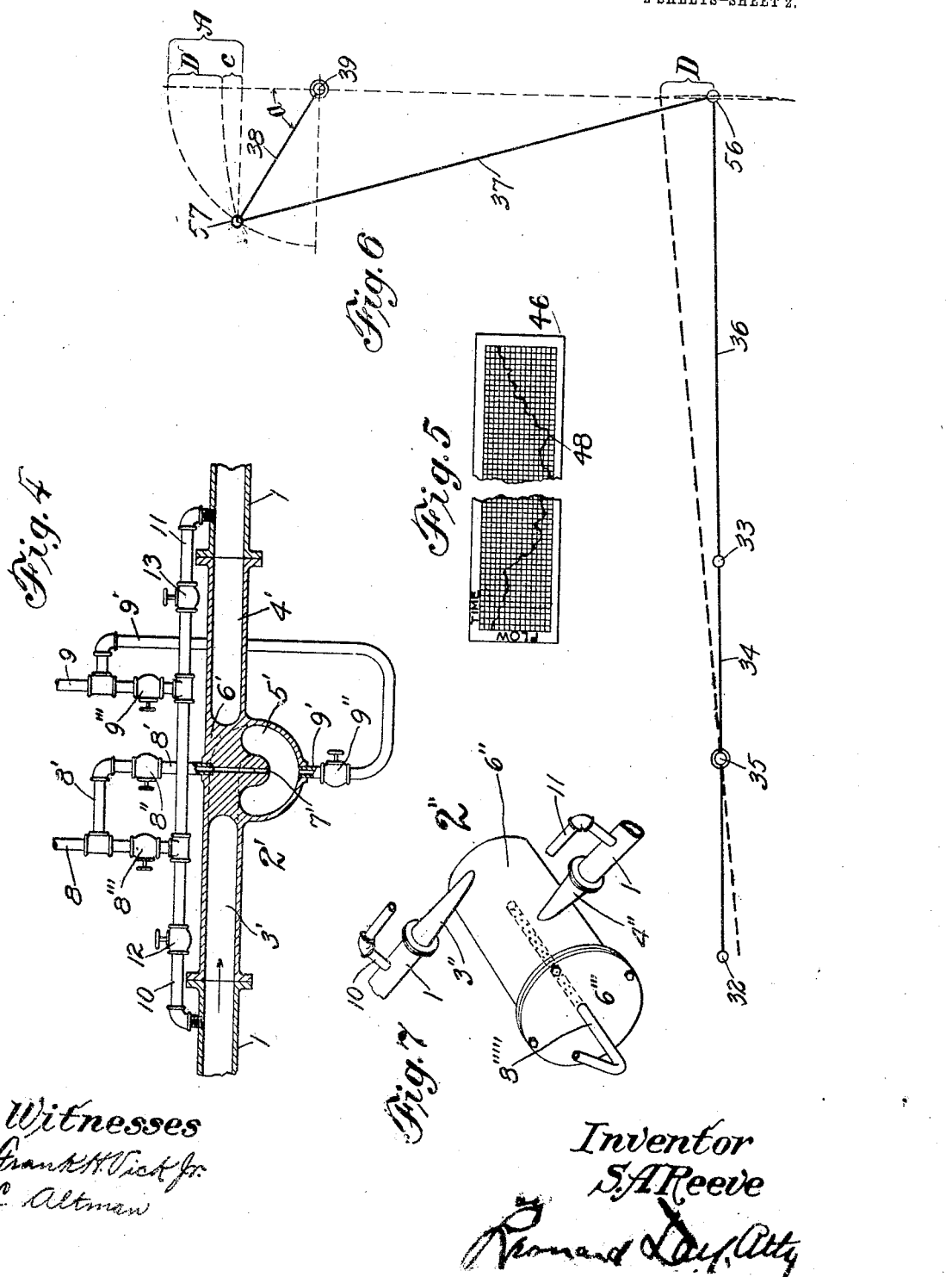

UNITED STATES PATENT OFFICE.

SIDNEY A. REEVE, OF NEW YORK, N. Y., ASSIGNOR TO ROTARY METER COMPANY, A CORPORATION OF NEW YORK.

FLUID-METER.

1,125,712.

Specification of Letters Patent.

Patented Jan. 19, 1915.

Application filed September 10, 1910. Serial No. 551,588.

*To all whom it may concern:*

Be it known that I, SIDNEY A. REEVE, a citizen of the United States, and a resident of Tompkinsville, Staten Island, county of Richmond, city and State of New York, have invented certain new and useful Improvements in Fluid-Meters, set forth in the following specification.

This invention relates to fluid-meters of the type in which the rate of flow is manifested by a difference in hydro-static head or pressure, usually designated in this type of meter by the difference of pressure between two piezometer tubes. In all hydraulic or fluid-apparatus for measuring flow including and similar to the Venturi meter, such as the Pitot-tube, orifice, etc., the pressure difference set up by the fluid-flow varies (approximately) as the square of the rate of flow. As a result, the pressure difference is inconveniently exaggerated for large flows and inconveniently if not actually inoperatively, diminished for small flows. A flow three times normal will develop nine times the normal difference in hydro-static head or normal difference in piezometer readings; while a flow one-third of normal will set up only one-ninth of the normal difference in hydro-static head or normal difference in piezometer readings. There have been, therefore, two principal objections to the use of known apparatus of this sort. First,—a small flow cannot be measured with accuracy and the range of the instrument in both directions is limited; second,—any scale for recording the varying pressure differences has, of necessity, to be laid off in irregular units when these units are to denote rates of flow. The unit divisions at one extremity of the range must be very small and much exaggerated at the other limit of range. As a result of this irregularity in the size of the unit divisions on a recording card, the diagram produced is impossible of integration by ordinary planimeters, in order to ascertain the total or average flow over any given period. Fluid-meters of this general type are also objectionable on the following grounds:—The Venturi type, for length of main occupied; the Pitot-tube, for sensitiveness to slight deformation of mouth-piece; and the orifice type, for sensitiveness to weight upon the sharp edges of the orifice. To avoid all of these difficulties I employ centrifugal force developed by giving to the entire flow a curvilinear path.

It is an object of the invention to improve in general upon fluid-meters of the type described and more specifically to improve the same by overcoming the objections enumerated.

In furthering the objects of this invention, a curved or helical tubular throat may be substituted for the usual straight cylindrical tubular throat heretofore used for connecting the converging and diverging conical tubes of the Venturi meter. By this substitution a curved path is given to the entire fluid-flow and centrifugal force is produced to serve the purpose of magnifying the differences between the piezometer pressures. Also means may be provided for indicating and recording automatically the square-roots of the differences of piezometer pressures, thereby rendering possible the employment of a diagram card divided into uniform units, indicating rates of flow. Furthermore it is broadly contemplated as new to impart a curved path to the fluid-flow, as in a curved or helical duct or passage-way connected into a fluid-main and, by determining the difference in piezometer readings between the fluid-main and the helical duct to obtain a measure of the rate of fluid-flow.

A further object of the invention is to differentiate, in an improved manner, fluid-pressures as, for example, piezometer pressures.

The above and further objects of the invention are set forth in the following claims which should be read in connection with this specification which has reference to illustrative embodiments of the invention, shown in the accompanying drawings, which form a part of this application, and in which,—

Figure 1 is a plan view of the differentiating and recording apparatus; Fig. 2 is a vertical section through a complete embodiment of the apparatus with parts shown in vertical elevation: Fig. 3 is a horizontal section through line III—III of Fig. 2 looking in the direction of the arrows; Fig. 4 is a view corresponding to Fig. 2 showing a modification of the fluid-meter and the connections for piezometer tubes; Fig. 5 is a representation of a diagram card for use with the apparatus; Fig. 6 is a diagram indicating the mechanical movement for transforming motion commensurate with piezometer pressure differences into motion commensurate with the square-roots thereof; and Fig. 7 is a perspective view showing a modified curved-path-producer or whirl-producer.

Reference should now be had to the drawings. The fluid-main through which flow is to be measured is indicated by 1 in the various figures. Connected into this main so that the entire fluid-flow must pass therethrough is means for altering the hydro-static head. This means is indicated in Figs. 2 and 3 by 2, in Fig. 4 by 2′, and in Fig. 7 by 2″. This means 2, 2′ and 2″ is preferably embodied in a single casting as indicated in the various figures. In Figs. 2 and 3 it comprises the usual converging conical tube 3 and the diverging conical tube 4 well known in meters of the Venturi type and whereby the stored energy of a flowing fluid undergoes an alteration in the relative proportion of its component parts, namely, velocity head, pressure head and potential head, and in accordance with Bernoulli's theorem. Fluid-flow through the main 1 is supposed to be from left to right, into converging tube 3 and out of the diverging tube 4.

Instead of connecting the constricted ends of the tubes 3 and 4 through a straight cylindrical tubular duct, as is usual in previous Venturi meter construction, these parts are connected by a curved-path-producer, shown in this embodiment as a helical tubular duct 5 preferably formed in the hub 6 as an integral casting with the conical tubes 3 and 4. It has been found that a single turn is sufficient for this helical duct, although the actual amount of the turn or form of this helix or whirl-producer does not form a part of the broad invention. A small perforation or duct 7 is provided through the hub 6 to tap the interior of the helical duct 5 at the lowest point of its inner surface of the smallest radius. This duct 7 serves the purpose of connecting the low pressure piezometer tube 8 with the interior of the helical tube 5. Although the duct 7 is somewhat exaggerated in size for the purpose of illustration, it is to be understood that its purpose is merely to tap out hydro-static pressure and that its opening into the helical duct 5 is such as not to interfere with the flow of fluid therethrough.

The high pressure piezometer tube 9 is provided with two branches 10 and 11 controlled respectively by the valves 12 and 13 and respectively tapping into the head and foot portions of the main 1.

As is usual in Venturi meters the gain in velocity head at the throat of the meter entails a consequent loss in hydro-static head. This loss in hydro-static head is manifested by a difference in piezometer pressures. In the embodiment illustrated the difference in piezometer pressures for a given flow is greatly increased over that effected by the cylindrical-throat Venturi-meter by reason of the combination of the helical throat illustrated. As is well known in physics, centrifugal force varies as the square of the linear velocity. Likewise in the common type of Venturi meter the difference in hydro-static heads or piezometer pressures varies as the square of the velocity. Now, in Figs. 2 and 3, the low pressure piezometer tube is so connected into the helical duct 5 that the centrifugal force generated by the swirl of fluid passing therethrough operates to decrease the hydro-static pressure in the tube 8 and, as this centrifugal force is commensurate with the square of the fluid-flow, it forms a perfect combination with the loss in hydro-static head in a Venturi tube of known construction. There results as an advantage practically measurable differences in hydro-static heads, even for fluid-flows so small as heretofore to be impracticable of measurement.

The differentiation of the piezometer pressures in tubes 8 and 9 is accomplished by the differentiating apparatus 14, which in the embodiment illustrated is shown combined with the indicating and recording apparatus 15.

A box-like chamber is provided by a casting 16 of any suitable construction. A top casting 17 is provided and formed to seat upon the casting 16 and to be secured thereto as by bolts and lugs 18 to form a hermetical joint along the plane 19. The top casting 17 is formed with a pair of caisson-like chambers 20 and 21 which may have a common division wall 22 as indicated. These chambers open into the chamber formed by the bottom casting 16. Also opening at the bottom into the chamber of casting 16 is an upright shell 23, to contain the indicating and recording apparatus.

The piezometer tubes 8 and 9 are connected respectively into the top portions of the drums 20 and 21 as by means of packed nipple unions 24 and 25.

Liquid-displacement-members of equal mass and displacement are provided, one 26 within chamber 20 and another 27 within chamber 21. These displacement-members are shown fixed to vertical stems 28 and 29, which are guided at their upper ends in spiders 30 and 31 respectively and are hinged at their lower ends by double knife blade connections 32 and 33 to a walking lever 34 fulcrumed beneath and between the chambers 20 and 21 to a double knife blade pivot 35, mounted on casting 16. The knife blades 32 and 33 are upon opposite sides of and equidistant from the knife blade 35.

One arm of the walking lever 34 is provided with the extension 36 extending beneath the upright shell 23. The free end 56 of the arm 36 is pivotally connected by link 37 at 57 with the crank 38 fixed to the cross spindle 39 journaled at its ends in the shell 23. Near one end of the spindle 39 is fixed the spur gear 40 which meshes with the rack 41 mounted for vertical movement in suitable anti-friction bearing 42. The upper end of rack 41 extends vertically alongside of the card-drum 43, rotatably mounted on the vertical spindle 44. This drum 43 is arranged to be rotated uniformly in a well known manner by a clock-work 45 and forms a mounting for a diagram-card, such as the card 46 shown in Fig. 5. The upper end of the rack 41 is provided with a marking instrument such as the pencil 47 for tracing the fluid-flow curve 48 of the card 46.

A second rack 49 intermeshes with the gear 40 on its opposite side and serves as a counter-balance to offset the weight of the rack 41, while an adjustable weight 50 may be provided on the lever 34 to counterbalance the arm 36 and other connected parts. The upper end of the shell 23 may be hermetically closed by means of a glass bell-jar 51 suitably secured in position and of suitable strength.

In order to differentiate the pressures in the piezometer tubes 8 and 9 the apparatus comprising the castings 16 and 17 is filled with a suitable liquid such as water, oil, carbon tetra-chlorid or mercury, according to the degree of the piezometer pressures to be encountered. This liquid flows up into the chambers 20 and 21 to a certain height in each and to a certain height in the shell 23, its level in the present embodiment being indicated by the line 52 which shows the liquid level in all three compartments the same, although this is by no means necessary. The liquid levels in the various compartments and the various parts of the apparatus are adjusted so that, for zero flow, the parts of the apparatus shown in Figs. 1 and 2 will assume relative positions substantially as shown; the lever arm 36 in its uppermost position; the crank 38 in its uppermost position with the link 37 almost in contact with the cross-spindle 39; and with the pencil 47 in its uppermost or zero position. When the piezometer pressures are moderate it is satisfactory to have the shell 23 open to the atmosphere but with high piezometer pressures it is more expedient to have this shell hermetically closed, both of which conditions may be effected by the valve 53; or the interior of the shell 23 above the liquid level may be connected with one of the piezometer tubes as by the cross-connected valve 54.

The exact adjustment of the liquid levels in the chambers 20 and 21 and shell 23 is not necessary because the two displacement members 26 and 27 are exactly balanced against each other. For the same reason, the instrument is insensible to relative change of liquid level between shell 23, on the one hand, and chambers 20 and 21, on the other. It is sensitive only to relative (not absolute) changes in level between chambers 20 and 21.

Now, assuming the piezometer tube 9 connected to head at the main 1 (valve 12 open and valve 13 closed) and the piezometer tube 8 connected to throat (valve 55 open), (see Fig. 2) the apparatus will remain with its parts in the relative positions indicated when no flow occurs in main 1. In case flow occurs in main 1 from left to right, the piezometer pressure in tube 8 is caused to be less than that in tube 9 whereupon a change in the relative levels of the liquid in chambers 20 and 21 takes place, causing a corresponding relative change in position for the displacement members 26 and 27, which may be floats. The end 56 of lever arm 36 is displaced a certain distance which corresponds to the square of the flow of fluid through main 1. The movement of the end 56 of arm 36 is substantially in a vertical line, truly a flat arc, and is of such extent as to effect the counter-clockwise rotation of crank 38 down to only approximately horizontal position for a complete downward movement of the arm 36. That is, the crank 38 may be described as operative throughout only the second quadrant as shown in dotted lines in Fig. 6.

The purpose of the link and crank connection 37 and 38 is automatically to transform the movement of the end 56 of arm 36 into a movement commensurate with the square-root of the movement of end 56. This is best indicated diagramatically in Fig. 6 in which full lines designate the various parts bearing the corresponding reference characters. To accomplish this transformation of movement it has been found that the specified conditions will be fulfilled if the motion of the end 56 of arm 36 is substantially alined vertically with the spindle 39 and if the link 37 is $\sqrt{10}$ times as long as the crank 38 and in limiting the motion of the crank 38 to the second quadrant specified for this ratio of link to crank. The diagram of Fig. 6 is useful in checking this transformation. Assuming that the crank 38 has moved from exactly vertical position, which, of course, is impossible in the actual structure because of the dead-center there encountered, an angular movement of crank 38 is denoted by $a$; the vertical drop of crank pin 57 by $A$; and the vertical drop of arm end 56 by $D$. By simple geometry $$D = D' = A - C.$$

A equals versin $a \times$ the length of crank 38. C may be easily calculated by trigonometry, whereupon D is readily determined. Now what is desired is that $$\sqrt{D} \div a$$

should remain constant throughout as wide a range as possible. By assuming an arbitrary length for the crank 38 it will be found that, for all values of angle $a$ from 2° to 90°, the above ratio will remain constant within 1% variation, which is sufficiently accurate.

The movement of the recording pencil 47 is commensurate with the angular movement of crank 38 because of its rack and gear connection. All that is necessary is to divide the diagram card 46 into uniform horizontal time units and uniform vertical fluid-flow units, selecting the scale for the flow-units to allow for the coefficient of the meter. The pencil is therefore an indication of the rate of flow which it records upon the card 46.

*Modification.*—The complete apparatus previously described embodies a combination of the converging and diverging tubes of the ordinary Venturi construction with a helical throat. This combined structure is by no means necessary to measure the flow of fluids, although the combined effect of centrifugal force and the Venturi tube alteration of hydro-static pressure, both commensurate with the square of the velocity of fluid-flow, has an advantage.

In Fig. 4 the modification of all apparatus below the upper connections of the piezometer tubes 8 and 9 is indicated. In this modification there are no converging and diverging conical tubes for the fluid main. This apparatus 2' comprises connecting ducts 3' and 4' for the main 1 and leading to and from the helical throat 5' in the hub 6'. The piezometer duct 7' corresponds exactly with the previously described duct 7. It may be connected into the pipe 8', in the connection of which with piezometer tube 8 is the controlling valve 8''. The piezometer tube 9 is connected with the head and foot of main 1 by the previously described connections and valves 10, 11, 12 and 13. In addition a piezometer tube-tap 9' is connected into the periphery of the helical duct 5' beneath the opening of the duct 7' and is shown controlled by the valve 9'' and leading to the piezometer duct 9. An additional controlling valve 9''' is also provided for tube 9. The tube 8 is also connected through valve 8''' with duct 10, branching from tube 9. By means of this series of connections and valves various combinations may be effected for the piezometer connections 8 and 9; the differences in hydro-static pressure may be measured between the duct 10 and the duct 7'; between the duct 11 and the duct 7'; between the duct 9' and the duct 10; between the duct 9' and the duct 11; and between the duct 9' and the duct 7'. All this is accomplished merely by the proper manipulation of the valves. At duct 9' hydro-static pressure is increased by centrifugal force while at 7' it is decreased by centrifugal force. This Fig. 4, illustrating the various combinations of the piezometer connections for apparatus having no converging or diverging tubes, is equally illustrative of the various combinations which may be employed with the converging and diverging tubes 3 and 4, as shown in Figs. 2 and 3.

*Modification of Fig. 7.*—As has previously been explained the purpose of the helical ducts 5 and 5' is to produce a swirl of fluid and thereby to generate centrifugal force to reduce the hydro-static head. This being the case, it is considered to be obvious that a helical tubular duct is by no means necessary to produce such a swirl. For instance a structure corresponding to that shown in Fig. 7, which would accomplish the purpose, may be employed instead of the helical duct and also has the advantage of cheapness and simplicity of construction; small inner diameter; and serves as a pulsation queller of greater pulsation quelling capacity than the mere helical duct. In this construction there is provided a hollow cylindrical casing 6'', which is provided with end closures which may be removable as is end 6'''. Fluid from the fluid main 1 enters through the inlet tubular duct or nozzle 3'', which directs its discharging jet of fluid tangentially against the inner periphery of the drum-like structure 6''. This tangential jet sets up a whirl of fluid about the axis of the cylindrical casing 6'' which discharges out of the tangentially arranged exit duct 4''. In this structure the low pressure piezometer tube may be introduced in the manner indicated for the tube 8''''', that is, axially of the casing 6''. The intrusion of this tube 8''''' may be varied although it is preferred that it terminate short of the inlet duct 3'', to permit the inlet-end of the whirl to be subject to pulsations which do not travel through to effect this central piezometer tube. The tube may be closed at its inner end and provided with lateral perforations. The cylindrical casing 6'' in this structure may be of any desired size and operates to form a fluid-fly-wheel or a storer of energy, whereby any tendency to pulsate introduced through the inlet tube 3'' is overcome and pulsations are quelled at the exit tube 4''. The term "cylindrical" is used here in its broad sense to denote a casing the cavity within which is a geometric solid of revolution.

Head pressure may be tapped off at the pipe 10 and foot pressure at the pipe 11, it being understood that these pipes are to be connected to the piezometer tube 9 in a manner described in connection with the previous figures. The tube 8′′′′′ likewise is to be connected to the piezometer tube 8.

It is, of course, to be understood that what has been shown and described is merely illustrative of the invention and it is deemed to be understood that the embodiment of the apparatus should comprise approved hydraulic construction and fittings; that the term "curved-path-producer" is generic relatively to the terms "whirl-producer" and "helical duct"; that, in the differentiating apparatus 14, the end 56 of arm 36 may be termed "means movable commensurately with the square of the velocity of fluid-flow in main 1," which is true whether the moving force for the arm 36 is actuated by centrifugal force or by any force resulting from the kinetic head of flow or by a combination of such forces; that no specific limitation to operation in the northwest quadrant is intended for the square-root transforming apparatus; that proper coefficients should be employed in all cases in making records of fluid-flow; that the term fluid is inclusive, as used herein, of both liquids and gases; and that suitable materials well known in the art are to be employed for the construction of the various parts.

What is claimed and what is desired to be secured by United States Letters Patent is:—

1. In a fluid-meter of the Venturi type; a converging tube and a diverging tube of usual construction; a curved-path-producer connecting said tubes; and piezometer connections whereby centrifugal force in said curved-path-producer increases the values of the pressure differences due to the usual Venturi action.

2. In a fluid-meter of the Venturi type; a converging tube and a diverging tube of usual construction; a curved-path-producer connecting said tubes; and piezometer connections whereby centrifugal force in said curved-path-producer varies the differences of piezometer pressure approximately in proportion to the squares of the velocities of fluid-flow, to increase the values of the pressure differences due to the usual Venturi action.

3. In a fluid-meter, a fluid-main; a curved-path-producer connected into said main; piezometer tubes, one connected into said main and one into said curved-path-producer; means for differentiating the piezometer pressures and having a part movable commensurately with changes in the differences in piezometer pressures; a recording instrument; and means operated by said part for actuating said recording instrument commensurately with the square-roots of changes in the differences of piezometer pressures.

4. In a fluid-meter of the Venturi type; a fluid-main; means for altering the hydrostatic-head comprising a converging tube and a diverging tube connected by a curved-path-producer; piezometer tubes, one connected into said main and one into said curved-path-producer; and means for differentiating the pressures in said piezometer tubes.

5. In a fluid-meter of the Venturi type; a fluid-main; means for altering the hydrostatic-head comprising a converging tube and a diverging tube connected by a curved-path-producer; piezometer tubes, one connected into said main and one into said curved-path-producer; means for differentiating the piezometer pressures and having a part movable commensurately with changes in the differences in piezometer pressures; a recording instrument; and a mechanical movement carrying said recording instrument and having an operative connection with said part movable commensurately with changes in the differences in piezometer pressures and operative to impart to said recording instrument movements commensurate with the square-roots of the movements of said connection.

6. In a fluid-meter, means for quelling pulsations and altering the hydro-static-head in a fluid-main comprising a whirl-producer having a cylindrical cavity and tangentially arranged inlet and exit tubes spaced apart axially of said cylindrical cavity.

7. In a flow-recorder for fluids, pressure operated means movable commensurately with the square of the velocity of fluid-flow; a pitman attached thereto; a crank driven by the pitman and adapted to move through virtually one quadrant of arc; and indicating means mechanically connected with said crank and movable proportionately with the angular motion of the crank.

8. In a flow-recorder for fluids, a pressure device; means for operating said pressure device by the kinetic head of flow; a crank and pitman operated by said pressure device and adapted to approach dead center as the flow approaches zero; and indicating means mechanically connected with said crank and movable proportionately with the angular movement of said crank.

In witness whereof, I have signed my name to this specification, in the presence of two subscribing witnesses.

SIDNEY A. REEVE.

Witnesses:
CHRISTINE E. HANSELMANN,
W. G. ALLEN.